Oct. 28, 1947.  D. E. CREWS  2,429,670
PRINTER'S ROLLER
Filed Aug. 6, 1943
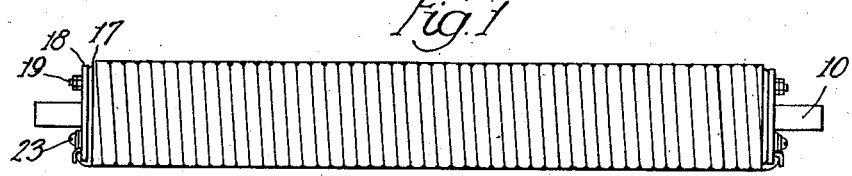
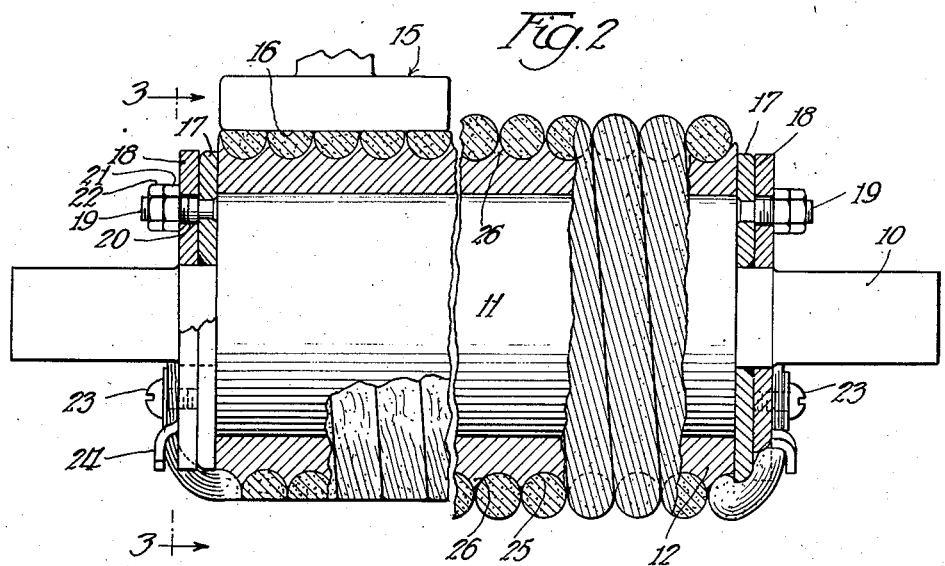
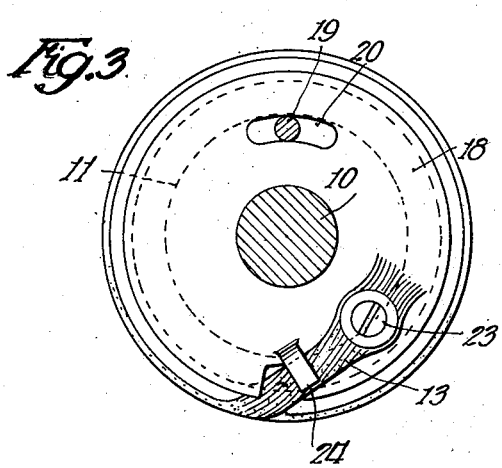
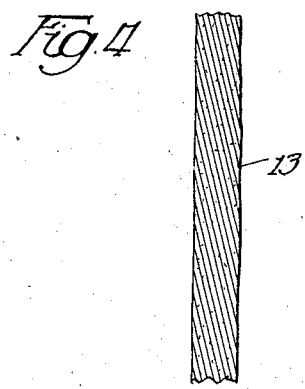
Inventor.
Don E. Crews
By Sheridan Davis & Cargill
Attys.

Patented Oct. 28, 1947

2,429,670

UNITED STATES PATENT OFFICE 2,429,670

PRINTER'S ROLLER

Don E. Crews, Chicago, Ill., assignor to Sam'l Bingham's Son Mfg. Co., Chicago, Ill., a corporation of Illinois Application August 6, 1943, Serial No. 497,598

4 Claims. (Cl. 91—67.8)

This invention relates to improvements in printers rollers and to the method of making the same. The improved rollers are useful either as dampening rollers in lithographic processes or in ink transfer mechanisms of printing presses.

Dampening rollers used in lithographic processes frequently are provided with woven fabric surfaces which in the course of use retain ink and other matter and necessitate cleaning. Brushes generally are employed by workmen in cleaning the fabric and the resulting attrition of the fabric substantially shortens its period of usefulness. Due to the woven character of the fabric, the bristles do not easily penetrate the fabric and hence thorough cleansing is difficult. Transfer rollers, especially those used in ink transfer mechanisms of high speed presses, frequently are damaged by impact with the driven fountain rollers, and where their surfaces are non-absorptive or are of low ink absorptive or pick-up capacity, they frequently create an ink mist in the room which is wasteful of the ink and objectionable for hygienic reasons.

One object of the invention is to provide a roller having a fiber surface which is adequately absorptive of water, dampening fluids or inks, depending on the use to which the roller is applied, and which can be cleaned, as with a brush for example, more readily than conventional woven fabric covered rollers and with less damaging attrition of the roller surface.

Another object of the invention is to provide a roller having an absorptive covering that can be applied readily to rollers bodies of any diameter and with the desired tension and provides a uniform working surface.

Another object of the invention relates to the method of covering a roller body.

An additional object of the invention is to provide a roller having an absorbent fiber working surface, the superficial threads or strands of which are highly resistant to displacement by peripheral impact with another roller and which, while durable, is readily renewable.

In the accompanying drawing wherein one form of the improved roller is shown for illustrative purposes, Figure 1 is an elevational view of a printers roller embodying the present invention;

Fig. 2 is an enlarged central sectional view (partly in front elevation) illustrating the roller in different stages of manufacture;

Fig. 3 is an end elevational view taken on line 3—3 of Fig. 2;

Fig. 4 is an elevational view of a section of roller covering material;

In Figs. 1 and 2 of the drawing the roller therein illustrated comprises a conventional shaft 10, the intermediate portion of which, as indicated at 11, is of enlarged diameter. A roller body 12 is shown in section in Fig. 2 which may be of a suitable composition material, such as rubber, for example, to afford suitable resilience, although other materals having suitable characteristics for particular uses may be employed.

The cover of the roller which provides a durable and relatively easily cleaned working surface that has been found satisfactory for dampening rollers used in lithographic processes and in ink transfer mechanisms of printing machines is helically applied to the body of the roller. The material illustrated (Fig. 4) is in strand form as indicated at 13 in Fig. 4, that is, the strand is composed of a group of "ends" or threads twisted or helically intertwined. For the two specific uses above mentioned, strands formed of long fiber or sea island cotton have been found most satisfactory and may be assumed to be the material shown in the drawings for illustrative purposes.

In commerce such a strand of the material mentioned is frequently referred to as "ready rope." In commercially available "ready rope" the strands are not particularly firm because of the relatively low degree of twist of the threads into strand form, but in use in accordance with the present improvements, the firmness may be varied by increasing or decreasing the extent of twist of the strand. The firmness of the resulting roller cover therefore can be controlled by varying the degree of twist of the strand prior to or at the time of application to the roller body. A strand can be applied to a roller body by anchoring one end of the strand to an end of the body, rotating the roller as in a lathe and guiding the strand in a helical path as it is wound upon the body as illustrated in the right-hand portion of Fig. 2. In order to provide a relatively smooth cylindrical outer working surface, the outer peripheral surfaces of the convolutions of the helically disposed strand must be flattened, that is, flattened in transverse section. This result may be accomplished by an ironing process, for example, by holding a smooth flat instrument against the outer surface of the cover as the roller rotates.

The pressing or ironing instrument should have a smooth surface which, while it will level the semi-cylindrical contour of the convolutions into a smooth substantially continuous cylindrical surface will not abrade or scuff the threads. A satisfactory instrument is illustrated at 15 in Fig. 2, the unheated ironing or smoothing surface 16 thereof that is pressed against the roller covering being plate glass.

Any suitable means may be employed for attaching the ends of the strand 13 to the roller. In Fig. 2 of the drawings, the roller illustrated is provided with discs 17, one adjacent each end of the body 12 and which are fixed to the shaft. A second pair of relatively movable discs 18 is shown, one adjacent each of the discs 17 and each secured to one of the latter by a threaded stud 19 which passes through an arcuate slot 20 in a disc 18. The illustrative arrangement permits of limited relative rotation of the discs 18 with respect to the adjacent disc 17 for applying tension when desired to the anchored ends of the strand. The studs 19 are shown each with a nut 21 and a lock nut 22 for locking the adjacent discs together.

In applying a covering to a roller mounted for rotation, as in a machine lathe, one end of the strand is secured beneath a head of a screw 23 carried by the adjacent disc 18. The strand 13 is then passed under a finger 24 struck from the disc 18 and passed over to the outer surface of the body 12 of the roller. The roller is rotated and the strand is wound helically under suitable tension upon the body. The other end of the strand is then anchored to the second screw 23 after drawing the end under the adjacent finger 24 to retain the strand tautly upon the roller. During the winding of the strand upon the roller the ironing element 15 is pressed firmly against the convolutions as the winding of the strand progresses and may be passed back and forth along the surface of the rotating cover to produce a relatively smooth cylindrical working surface. It has been found advantageous to wet the strand with water prior to applying it to the roller, since it is more readily given a flat surface when wet and the resultant shrinkage that occurs as it dries tightens it firmly upon the roller body and likewise prevents excessive loosening upon the roller when later wetted during use. To the water used in wetting the strand as it is applied to the roller, substances may be added if desired which improve particular characteristics of the cover. For example, the addition of a suitable wetting agent or agents improves the ability of the cover to pick up water and ink in use.

In order to support the inner surfaces of the convolutions of the strand against inward displacement during use which would impair the regularity of the outer cylindrical surface of the finished cover, the surface of the body 12 of the roller shown in Fig. 2 is provided with a helical groove or channel 25 of the diameter snugly to receive the strand and of a lead such that the adjacent convolutions of the strand will be in closely abutting relation upon application of the strand to the roller body. The helical grooving of the body provides formations 26 which fill the spaces between the inner portions of contiguous convolutions of the strand and hence support the abutting portions of the strand convolutions against inward displacement during use. The supporting formations 26 are shown integral with the roller body, but it is contemplated that they may be non-integral and applied to the body concurrently with the application of the strand, for example.

As illustrated in Figs. 2 and 4, the degree of twist of the threads about the axis of the strand is such that upon application of the strand to the roller the threads at the exposed outer surface extend generally in the direction of the strand but are not parallel therewith (see Fig. 2). Hence, if a thread is broken in use, the loose ends cannot continue to unwind since each exposed portion of a thread is relatively short, but, due to the fact that none of the threads lie directly transversely of the strand, as with woven fabric covers, the improved covers can be cleaned readily by brushing generally in the direction of the strands or in a direction substantially parallel with the exposed portions of the threads which avoids unduly abrading or scuffing them. The removal of ink or other materials retained by the improved covers after use is relatively easily accomplished since the bristles of a brush, moved substantially parallel with the exposed portions of the threads constituting the cover surface, can penetrate between the threads quite freely and dislodge foreign matter.

It will be observed also that the stresses imposed on the superficial or exposed threads of the cover by impact with a rotating roller, are exerted in directions generally lengthwise of the threads and hence there is little tendency to displace the threads from their original positions and as a result the cover satisfactorily retains its substantially smooth outer working surface.

While an embodiment of the improvements has been shown and described for illustrative purposes, variations therein may be utilized within the spirit of the invention.

I claim:

1. A printers roller having a cylindrical body and a cover thereon comprising a fibrous strand of helically intertwined threads, the strand enveloping the body in contiguous helical convolutions each having an outer periphery flat in transverse section and together providing a substantially continuous cylindrical outer working surface.

2. A printers roller having a cylindrical body provided with a helically channeled outer surface and a cover on the body comprising a strand of fibrous material formed of helically intertwined threads, said strand lying in said channel in contiguous laterally abutting convolutions each having an outer periphery flat in transverse section and formed of sections of the threads extending generally in the direction of the strand convolution and together providing a substantially continuous cylindrical outer working surface.

3. A printers roller comprising a cylindrical body and a cover thereon comprising a strand of fibrous material embracing the body in laterally abutting helical convolutions having outer peripheries flat in transverse section and providing a continuous outer surface, said strand comprising a plurality of fibrous threads helically intertwined and individually presenting relatively short sections in the outer surface of the cover.

4. A printers roller comprising a cylindrical body and a cover thereon comprising a strand of fibrous material embracing the body in laterally abutting helical convolutions having outer peripheries flat in transverse section and providing a continuous outer surface, said strand comprising a plurality of fibrous threads helically intertwined and individually presenting relatively short sections in the outer surface of the cover which extend generally in the direction of rotation of the roller.

DON E. CREWS.

REFERENCES CITED

The following references are of record in the file of this patent:

UNITED STATES PATENTS

| Number | Name | Date |
|---|---|---|
| 683,123 | Knill | Sept. 24, 1901 |
| 753,497 | Kimball | Mar. 1, 1904 |
| 1,753,201 | Edlich | Apr. 8, 1930 |
| 1,853,839 | Wolcott | Apr. 12, 1932 |
| 2,152,612 | Tischer | Mar. 28, 1939 |